United States Patent
Safai et al.

(10) Patent No.: US 10,712,292 B2
(45) Date of Patent: Jul. 14, 2020

(54) BACKSCATTER X-RAY INSPECTION SYSTEM FOR PIPES

(71) Applicant: The Boeing Company, Chicago, IL (US)

(72) Inventors: Morteza Safai, Newcastle, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 15/940,622

(22) Filed: Mar. 29, 2018

(65) Prior Publication Data
US 2019/0302037 A1    Oct. 3, 2019

(51) Int. Cl.
*G01N 23/203* (2006.01)
*G01N 23/02* (2006.01)
*G01N 23/20025* (2018.01)

(52) U.S. Cl.
CPC ........... *G01N 23/203* (2013.01); *G01N 23/02* (2013.01); *G01N 23/20025* (2013.01); *G01N 2223/628* (2013.01); *G01N 2223/646* (2013.01)

(58) Field of Classification Search
CPC ............... G01N 21/952; G01N 21/954; G01N 2223/628; G01N 23/20083; G01N 23/203
See application file for complete search history.

(56) References Cited

U.S. PATENT DOCUMENTS

| 5,963,030 A * | 10/1999 | Stark | G01B 7/12 324/228 |
| 8,759,780 B2 * | 6/2014 | Dobbs | G01B 15/02 250/360.1 |
| 9,151,721 B2 | 10/2015 | Safai | |
| 2005/0041775 A1 * | 2/2005 | Batzinger | G01N 23/04 378/59 |
| 2011/0168900 A1 | 7/2011 | Dobbs | |
| 2012/0148026 A1 | 6/2012 | Safai | |
| 2013/0195248 A1 | 8/2013 | Rothschild et al. | |
| 2015/0373822 A1 | 12/2015 | Churchman et al. | |

OTHER PUBLICATIONS

Safai et al., "X-Ray Inspection System for Pipes," U.S. Appl. No. 15/701,244, filed Sep. 11, 2017, 44 pages.
Georgeson et al., "High Speed Pipe Inspection System," U.S. Appl. No. 15/701,301, filed Sep. 11, 2017, 56 pages.
Safai et al., "X-Ray Inspection System and Method for Pipes," U.S. Appl. No. 15/940,558, filed Mar. 29, 2018, 65 pages.
European Patent Office Extended Search Report, dated Oct. 18, 2019, regarding Application No. 19159782.2, 10 pages.
De Souza et al., "Analysis of the Influence of Liquid and of External Coating Material on the Quality of the Radiographic Image of Offshore Pipes Using Computational Modeling," Materials Science Forum, vol. 775-776, Jan. 1, 2014, pp. 197-202.
European Patent Office Extended Search Report, dated Sep. 19, 2019, regarding Application No. 19162271.1, 9 pages.

* cited by examiner

*Primary Examiner* — David P Porta
*Assistant Examiner* — Fani Boosalis
(74) *Attorney, Agent, or Firm* — Yee & Associates, P.C.

(57) ABSTRACT

A method and a system for scanning an elongate structure. A scan of the elongate structure with a fluid in a cavity of the elongate structure is received. The scan is generated by a scanner using an x-ray beam. Data in the scan is filtered to remove a portion of the data in the scan attributable to the fluid to form filtered data, enabling detecting an inconsistency on a wall of the elongate structure in the filtered data.

23 Claims, 9 Drawing Sheets

BACKSCATTER X-RAY INSPECTION SYSTEM FOR PIPES

CROSS-REFERENCE TO RELATED APPLICATION

This application is related to U.S. Ser. No. 15/940,558, entitled "X-Ray Inspection System and Method for Pipes," filed concurrently herewith, which application is incorporated in its entirety by reference.

BACKGROUND INFORMATION

1. Field

The present disclosure relates generally to inspection systems and, in particular, to nondestructive inspection of elongate structures. Still more particularly, the present disclosure relates to a method, an apparatus, and a system for nondestructive inspection of pipes using x-ray scanners.

2. Background

Pipes are used in many industries to transport fluids. For example, the petroleum industry uses pipes to transport oil and gas. Pipes for transporting oil are made from steel or plastic and are usually buried. The oil is moved through the pipes by pump stations along the pipes.

Natural gas and similar gas fuels are pressurized into liquid form. Natural gas pipes are often constructed of carbon steel. As another example, district heating or teleheating systems use a network of insulated pipes which transport heated water, pressurized hot water, or sometimes steam, to a customer.

Water supply systems also employ pipes to transport drinking water to customers. Pumps pressurize potable water that flows through pipes to deliver water for consumption.

Pipe inspections are performed to determine the condition of the pipes. For example, an inspection may be made to determine whether obstructions, corrosion, or other inconsistencies are present in the pipes. Inspections also may be performed to determine wall thickness, weld quality, as well as other parameters. The pipe inspections involve nondestructive testing and may be performed in a number of different ways. For example, pipe inspections may be made using video. This type of inspection, however, involves introducing a device into the pipes. Another type of inspection uses x-rays. This type of testing allows for the inspection to be made from the exterior of the pipe.

One manner in which current x-ray inspections are performed is by hand. A human operator moves an x-ray scanning system along the pipe to perform the inspection. With insulated pipes, x-rays are directed through the pipe from a source on one side of the pipe and detected by a detector on the opposite side of the pipe to generate an image. In many cases, the source is then moved to the other side of the pipe and another image is generated.

Inspections are typically performed while fluids are being transported through the pipes. When inspections are performed using backscatter x-ray systems, the presence of fluids increases the difficulty in detecting inconsistencies in the walls of the pipes. Halting the transport of fluids to obtain a scan of the pipes is often infeasible. The pipes in some pipe systems may run for hundreds or thousands of miles. Time and cost for emptying pipes in a pipe system for an inspection is greater than desired.

Therefore, it would be desirable to have a method and apparatus that take into account at least some of the issues discussed above, as well as other possible issues. For example, it would be desirable to have a method and apparatus that overcome a technical problem with detecting inconsistencies in pipes carrying fluids.

SUMMARY

An embodiment of the present disclosure provides a scanning system comprising a scanner configured to emit an x-ray beam and a controller in communication with the scanner. The controller is configured to control the scanner to perform a scan of an elongate structure having a cavity with a fluid and filter data in the scan to remove a portion of the data in the scan attributable to the fluid to form filtered data, enabling detecting an inconsistency on a wall of the elongate structure in the filtered data.

Another embodiment of the present disclosure provides a pipe scanning system comprising a translating structure, a detector, and a controller. The translating structure is configured to move axially and rotationally on a pipe, wherein a fluid is present in the pipe. The scanner is connected to the translating structure and is configured to scan an object utilizing an x-ray beam. The controller is in communication with the translating structure and the scanner. The controller controls the translating structure to move on the pipe while the scanner performs a scan of the pipe using the x-ray beam. The data in the scan comprises pixels that indicate intensities of a backscatter of the x-ray beam detected by the scanner; filters the data to remove the intensities associated with the fluid to form filtered data; and determines whether an inconsistency on a back inner wall of an elongate structure is present using the filtered data.

Yet another embodiment of the present disclosure provides a method for scanning an elongate structure. A scan of the elongate structure with a fluid in a cavity of the elongate structure is received. The scan is generated by a scanner using an x-ray beam. Data in the scan is filtered to remove a portion of the data in the scan attributable to the fluid to form filtered data, enabling detecting an inconsistency on a wall of the elongate structure in the filtered data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current techniques for scanning pipes using backscatter x-ray systems do not always provide a desired level of accuracy. The illustrative embodiments recognize and take account that the presence of a fluid in a pipe reduces the ability to detect an inconsistency in the wall of the pipe.

The illustrative embodiments recognize and take into account that low z elements scatter photons from x-rays more than other elements. For example, B, C, N, O, F, Ne, He, Al, Si, P, S, CL, and Ar have atomic numbers that maximize scattering of photons from the x-rays.

The illustrative embodiments recognize and take into account that many fluids, such as hydrocarbons, have z or an atomic number that causes increased scattering when scans of elongate structures with fluids are performed. The illustrative embodiments recognize and take into account that this increased scattering reduces the ability to detect inconsistencies in an elongate structure, such as a pipe carrying a type of fluid.

For example, hydrocarbons contain carbon (C) which increases the scattering of x-ray photons. The illustrative embodiments recognize and take into account that aircraft fuel, oil, natural gas, and other types of hydrocarbon fluids can make inspecting an elongate structure containing these types of fluids more difficult to inspect for inconsistencies. Liquid nitrogen is used to freeze the ground during excavation and is another example of a fluid that results in difficulty in inspecting elongate structures containing fluids.

Thus, the illustrative embodiments provide a method, an apparatus, and a system for scanning an elongate structure carrying a fluid. For example, a scan of the elongate structure with the fluid in a cavity of the elongate structure is received. The scan is generated by a scanner using an x-ray beam. Data in the scan is filtered to remove a portion of the data in the scan attributable to the fluid to form filtered data. This illustrative process enables detecting an inconsistency on a wall of the elongate structure in the filtered data.

Figure 1:
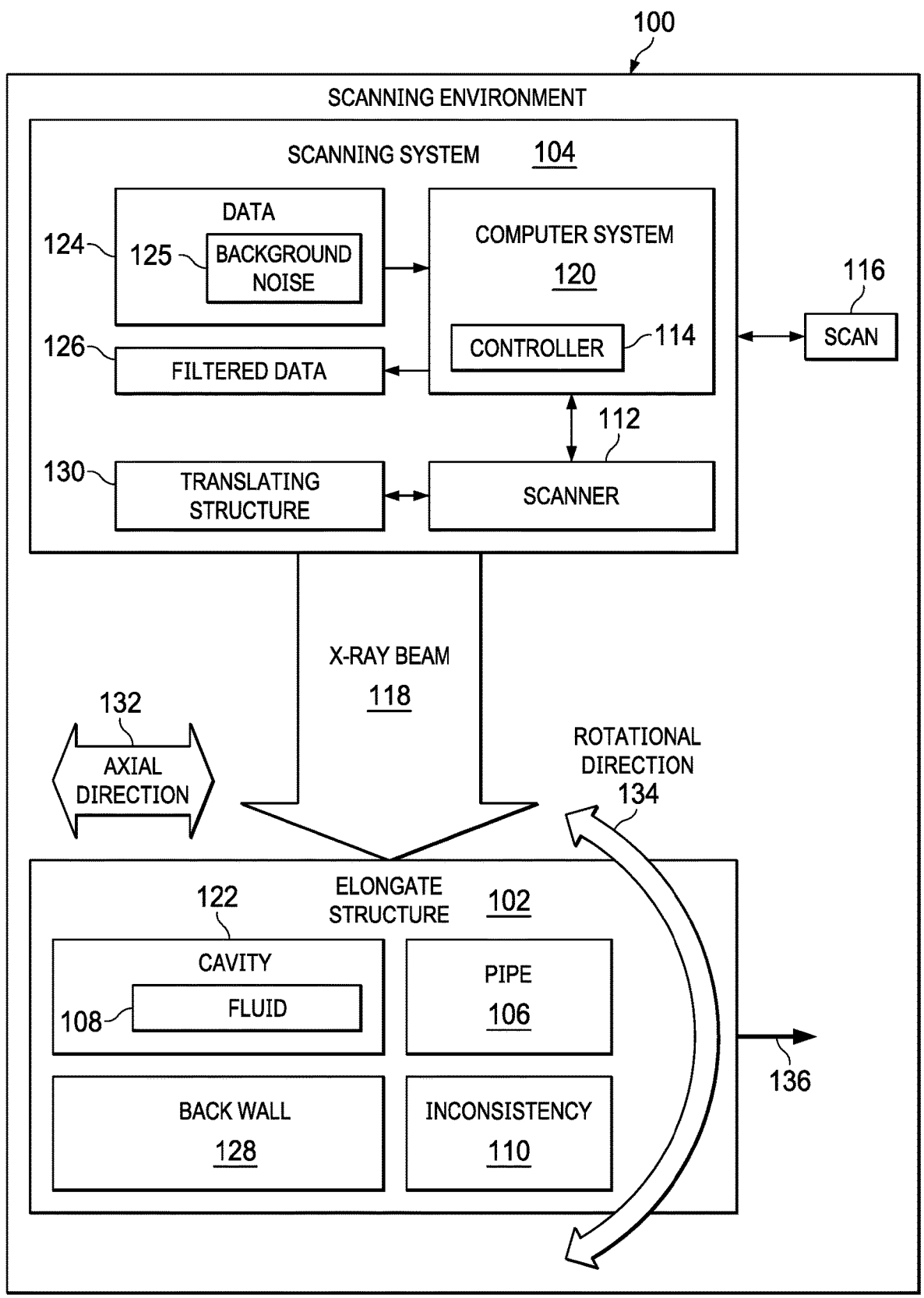
FIG. 1 is an illustration of a block diagram of a scanning environment in accordance with an illustrative embodiment.

With reference now to the figures and, in particular, with reference to FIG. 1, an illustration of a block diagram of a scanning environment is depicted in accordance with an illustrative embodiment. As depicted, scanning environment 100 is an environment in which elongate structure 102 can be inspected using scanning system 104. In this illustrative example, elongate structure 102 takes the form of pipe 106.

Pipe 106 carries various types of materials. For example, pipe 106 carries fluid 108. Fluid 108 can take a number of different forms. For example, fluid 108 can be selected from at least one of a liquid, a gas, crude petroleum, refined petroleum, hydrogen, a fuel, an aircraft fuel, oil, water, wine, beer, a natural gas, a biofuel, or other types of materials.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, scanning system 104 is used to determine whether inconsistency 110 is present within pipe 106. As depicted, inconsistency 110 is indicated by an unexpected result from a scanning of elongate structure 102. For example, the unexpected result may be a value that is greater or less than a threshold. The unexpected result may be a value that is outside of a desired range.

Inconsistency 110 may take a number of different forms. For example, inconsistency 110 may be selected from a group comprising corrosion, internal corrosion, external corrosion, flow-induced corrosion, pitting, thinning walls, an out-of-tolerance welding, an out-of-tolerance deposit, scale, a crack, damaged insulation, delamination, a void, and other undesired results.

As used herein, "a number of," when used with reference to items means one or more items. For example, "a number of different forms" is one or more different forms.

In this illustrative example, scanning system 104 includes a number of different components. As depicted, scanning system 104 comprises scanner 112 and controller 114.

As depicted, scanner 112 can perform scan 116 of elongate structure 102 using x-ray beam 118. In this illustrative example, x-ray beam 118 is comprised of x-radiation, which is a form of electromagnetic radiation. In this illustrative example, x-ray beam 118 has wavelengths from about 0.01 nanometers to about 10 nanometers, which correspond to frequencies from about 30 petahertz to about 30 exahertz having energies from about 100 eV to about 450 keV. X-ray beam 118 typically has a wavelength shorter than ultraviolet rays and longer than gamma rays.

As depicted, scanner 112 can perform scan 116 using a number of different types of x-ray scanning techniques. In the illustrative example, scanner 112 may be selected from at least one of an x-ray scanning system, a backscatter x-ray system, or a through transmission x-ray system.

In this illustrative example, controller 114 is in communication with scanner 112. Controller 114 can control the operation of scanner 112 to perform scan 116 of elongate structure 102. With controller 114, automated scanning of elongate structure 102 can be performed by scanning system 104.

In this illustrative example, controller 114 is located in computer system 120. Computer system 120 is a physical hardware system and includes one or more data processing systems. When more than one data processing system is present, the data processing systems are in communication with each other using a communications medium. The communications medium may be a network. The data processing systems may be selected from at least one of a computer, a server computer, a tablet, or some other suitable data processing system.

When operating, controller 114 controls scanner 112 to scan elongate structure 102 having cavity 122 with fluid 108 within cavity 122. In the illustrative example, scanner 112 generates data 124 for scan 116. In one illustrative example, data 124 in scan 116 comprises pixels that indicate intensities of a backscatter of x-ray beam 118 detected by scanner 112.

Controller 114 filters data 124 in scan 116 to remove the portion of data 124 in scan 116 attributable to fluid 108 to form filtered data 126. Controller 114 can also filter data 124 in scan 116 to remove the portion of data 124 attributable to background noise 125 to form filtered data 126. Background noise 125 can be caused by elements, such as, at least one of welding repairs, brackets in the grid, the grid structure, or other elements that can cause backscatter that can mask or act as noise, making detecting the inconsistency harder.

For example, the intensities and data 124 correspond to an energy of the backscatter. Controller 114 can filter data 124 to remove the intensities associated with fluid 108. As depicted, controller 114 can filter data 124 using at least one of a high-pass filter, a low-pass filter, a bandpass filter, or some other suitable type of filter. In other words, controller 114 can use any one of these types of filters alone or in combination.

In this illustrative example, scanning system 104 enables detecting inconsistency 110 in pipe 106 more accurately as compared to currently used techniques. For example, scanning system 104 enables detecting of inconsistency 110 on a wall, such as back wall 128 of elongate structure 102 in filtered data 126. Back wall 128 may be a back inner wall.

As depicted, controller 114 can be implemented in software, hardware, firmware, or a combination thereof. When software is used, the operations performed by controller 114 can be implemented in program code configured to run on hardware, such as a processor unit. When firmware is used, the operations performed by controller 114 can be implemented in program code and data and stored in persistent memory to run on a processor unit. When hardware is employed, the hardware may include circuits that operate to perform the operations in controller 114.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, scanning system 104 also includes translating structure 130, which is a physical hardware structure. Translating structure 130 is configured to move in at least one of axial direction 132 or rotational direction 134 along elongate structure 102. Translating structure 130 moves in axial direction 132 by moving in a direction coinciding with axis 136 extending centrally through pipe 106. Pipe 106 may have many axes through curves and bends in pipe 106.

Translating structure 130 can also move in rotational direction 134 by rotating on pipe 106 around axis 136. Translating structure 130 may combine both of these types of movement to move in a helical path along elongate structure 102. As depicted, translating structure 130 may be selected from a group comprising a motorized arm, a crawler arm, a track-based arm, and some other suitable type of structure that moves axially and rotationally.

In the illustrative example, scanner 112 is connected to translating structure 130. As used herein, a first component, scanner 112, "connected to" a second component, translating structure 130, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In one illustrative example, one or more technical solutions are present that overcome a technical problem with detecting inconsistencies in elongate structures, such as pipes carrying fluids. As a result, one or more technical solutions in the illustrative examples may provide a technical effect of filtering data from a scan of an elongate structure, such as a pipe or fuel tank in an aircraft wing, to remove a portion of the data in the scan that is attributable to the fluid. The filtering increases the ability to detect inconsistencies in elongate structures.

Thus, the illustrative examples provide one or more technical solutions that enable inspecting an elongate structure for inconsistencies without having to remove the fluid from a cavity in the elongate structure. As a result, elongate structures carrying fluids can be more easily and quickly inspected as compared to currently used techniques. For example, a fuel tank in a wing of an aircraft can be scanned without draining fuel from the fuel tank. As another example, a pipe carrying oil can be inspected more easily using scanning system 104 in FIG. 1. Inspecting a pipe extending for hundreds of miles can be performed more easily without having to drain the oil from the pipeline.

As a result, computer system 120 operates as a special-purpose computer system in which controller 114 in computer system 120 enables an ability to more efficiently detect inconsistencies in elongate structure 102. In particular, controller 114 transforms computer system 120 into a special-purpose computer system as compared to currently available general computer systems that do not have controller 114.

Figure 2:
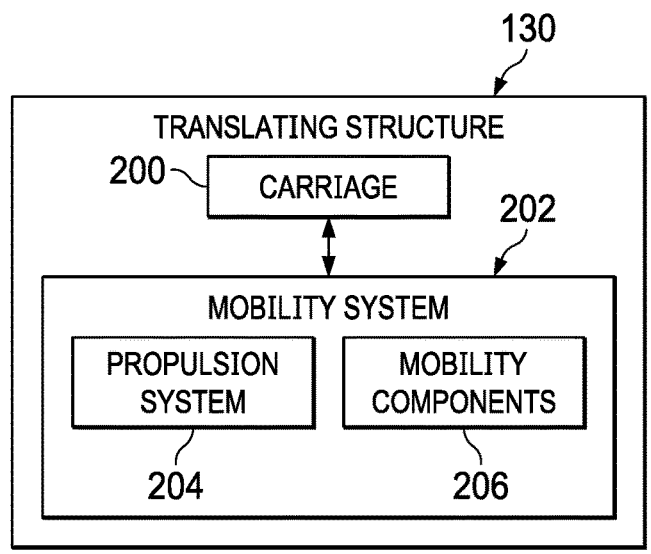
FIG. 2 is an illustration of a block diagram of a translating structure in accordance with an illustrative embodiment.

Turning next to FIG. 2, an illustration of a block diagram of a translating structure is depicted in accordance with an illustrative embodiment. In the illustrative examples, the same reference numeral may be used in more than one figure. This reuse of a reference numeral in different figures represents the same element in the different figures.

In this depicted example, translating structure 130 includes a number of different components. As depicted, translating structure 130 comprises carriage 200 and mobility system 202.

In this example, carriage 200 is a physical structure that is configured to attach itself to elongate structure 102 shown in block form in FIG. 1. For example, carriage 200 holds scanning system 104, shown in block form in FIG. 1, on elongate structure 102 such that mobility system 202 is able to move carriage 200 axially and rotationally with respect to elongate structure 102.

As depicted, mobility system 202 comprises propulsion system 204 and mobility components 206. The components are selected to move carriage 200 axially and rotationally. Propulsion system 204 may be an electrically controlled propulsion system. Propulsion system 204 may be, for example, without limitation, selected from at least one of an internal combustion engine, an electric engine, or some other suitable propulsion system.

Mobility components 206 provide carriage 200 with the capability to move in a number of directions. Mobility components 206 may be comprised of at least one of a roller, a wheel, a holonomic wheel, a track, or other suitable components. As used herein, a holonomic wheel (or an omni wheel) is one that is capable of moving in multiple directions across a surface.

Figure 3:
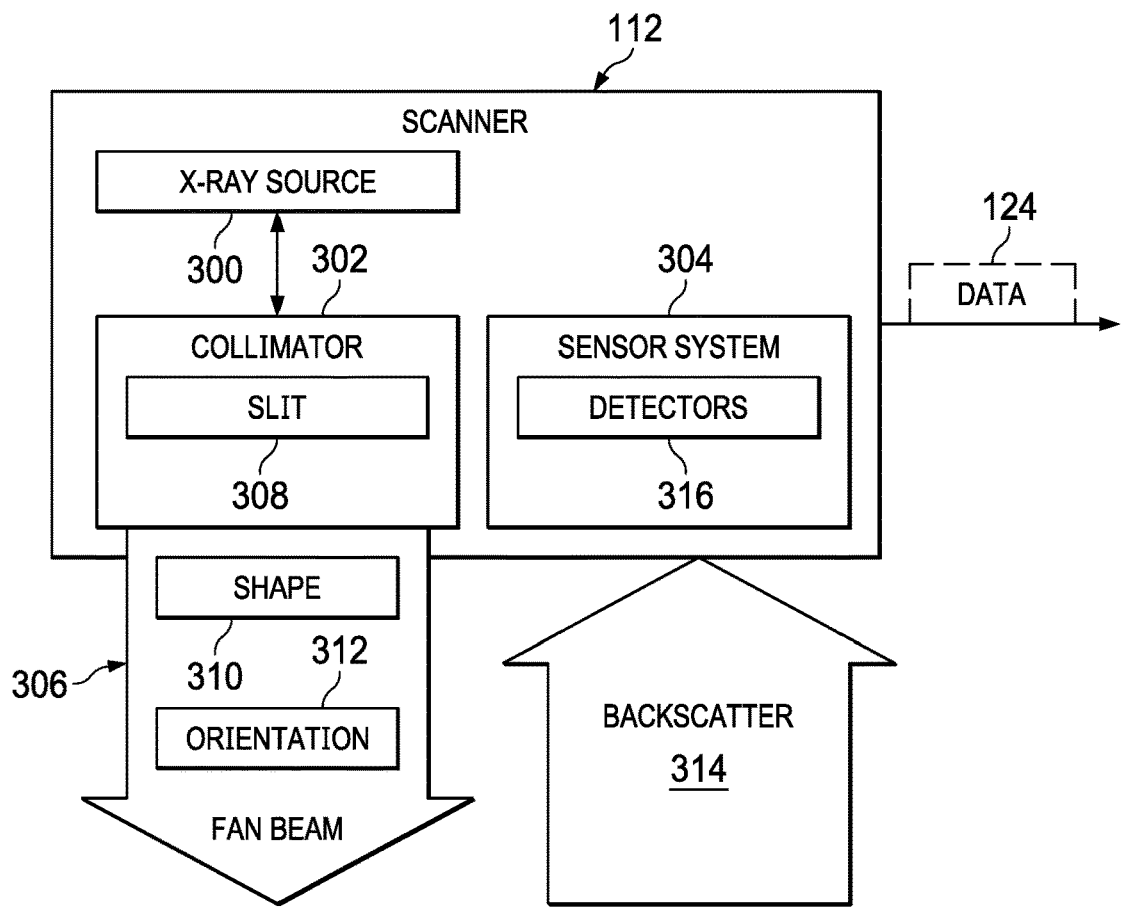
FIG. 3 is an illustration of a block diagram of a scanner in accordance with an illustrative embodiment.

With reference now to FIG. 3, an illustration of a block diagram of a scanner is depicted in accordance with an illustrative embodiment. As depicted, the components in this figure illustrate one example of an implementation for scanner 112 shown in block form in FIG. 1. In this illustrative example, scanner 112 comprises x-ray source 300, collimator 302, and sensor system 304.

X-ray source 300 is a source of x-rays that are emitted from scanner 112 as fan beam 306 in this illustrative example. Fan beam 306 is an example of an implementation for x-ray beam 118 shown in block form in FIG. 1. X-ray source 300 may be an x-ray tube. In this illustrative example, scanner 112 can be implemented as a self-contained unit. For example, x-ray source 300 can include a power source needed to provide power to generate fan beam 306.

In the illustrative example, collimator 302 is a device that narrows a beam of particles or waves to form fan beam 306. For example, slit 308 is present in collimator 302 that defines shape 310 of fan beam 306. Slit 308 has a rectangular shape, in this example, that causes shape 310 of fan beam 306 to be rectangular. Further, fan beam 306 has orientation 312.

As depicted, sensor system 304 detects backscatter 314 that results from an x-ray beam, such as fan beam 306, encountering elongate structure 102 shown in block form in FIG. 1. In this illustrative example, sensor system 304 generates data 124 and sends data 124 to controller 114 shown in block form in FIG. 1.

In this illustrative example, sensor system 304 is comprised of a group of detectors 316. As depicted, the group of detectors 316 can be implemented using solid-state detectors. These detectors may be arranged in an array as pixels. The solid-state detectors may be, for example, semiconductor detectors that convert x-ray photons to an electrical charge that forms data 124. This data is in a form that allows for generating a digital image.

The illustration of scanning environment 100 and the different components in this environment in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, pipe 106 may be an insulated pipe, an uninsulated pipe, or some combination thereof. For example, pipe 106 can have insulated and uninsulated sections. Further, elongate structure 102 may take other forms other than pipe 106. For example, elongate structure 102 may be selected from one of a drum, a fuel tank, a conduit, and other suitable types of elongate structures. When elongate structure 102 takes the form of a fuel tank, the fuel tank can be in or an integral part of a wing of an aircraft.

Figure 4:
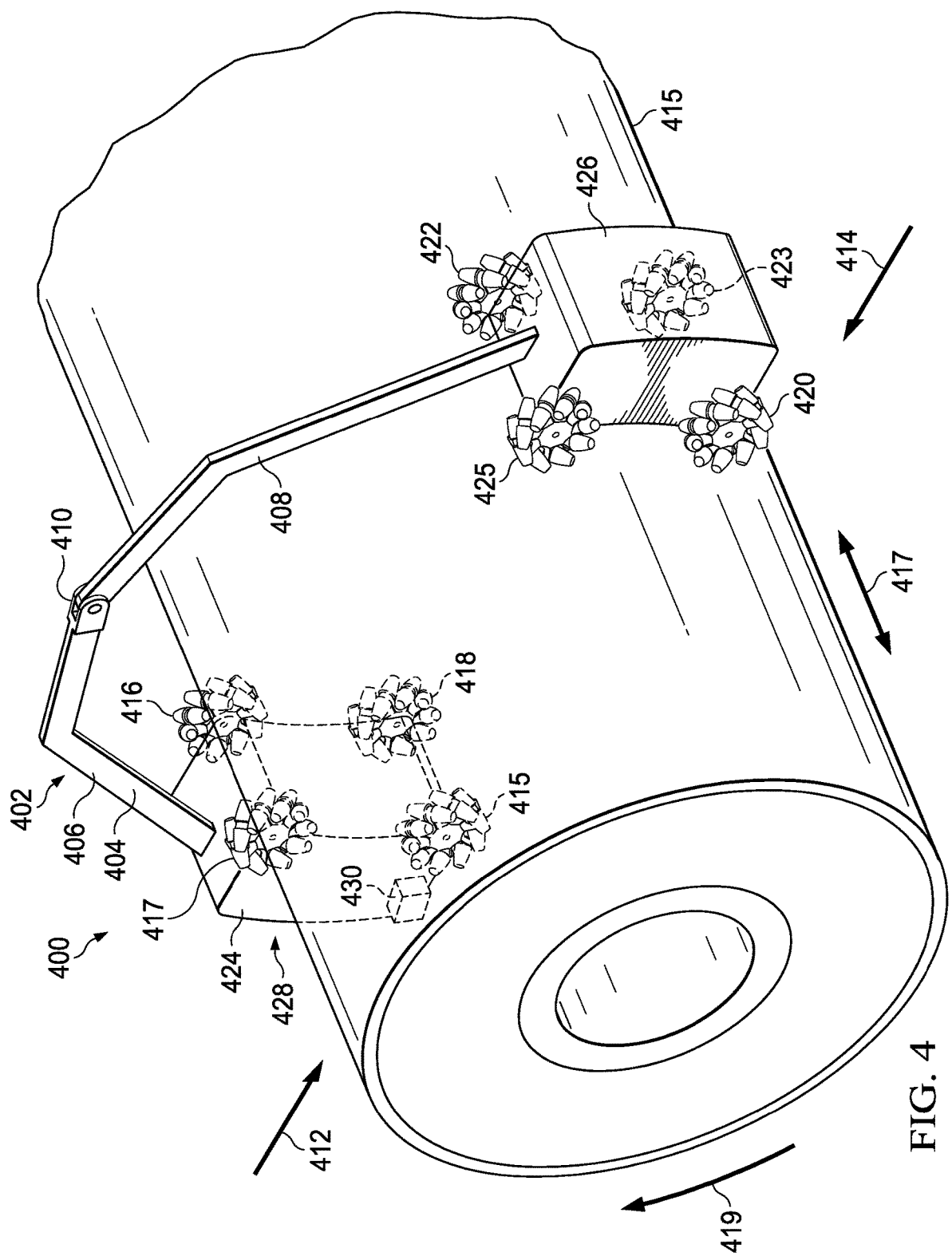
FIG. 4 is an illustration of a scanning system in accordance with an illustrative embodiment.

With reference now to FIG. 4, an illustration of a scanning system is depicted in accordance with an illustrative embodiment. In this illustrative example, scanning system 400 is an example of one physical implementation for scanning system 104 shown in block form in FIG. 1. As depicted, scanning system 400 takes the form of mobile scanning arm 402. In this illustrative example, mobile scanning arm 402 includes carriage 404, which is an example of one physical implementation for carriage 200 in FIG. 2 for translating structure 130 shown in FIG. 1 and FIG. 2.

In this illustrative example, carriage 404 includes structural member 406, structural member 408, and biased joint 410. Biased joint 410 connects structural member 406 and structural member 408 to each other. Biased joint 410 causes structural member 406 to be biased in the direction of arrow 412 and structural member 408 to be biased in the direction of arrow 414. In this example, carriage 404 is clamped to pipe 415 containing a liquid. Mobile scanning arm 402 can move axially as shown by arrow 417 and rotationally as shown by arrow 419 on pipe 415 to perform scans of pipe 415.

Biased joint 410 may be implemented using a number of different mechanisms. For example, biased joint 410 may be a spring-loaded joint, a hydraulic piston, a screw actuator, a slide-and-snap adjustment system, or some other suitable mechanism.

Mobile scanning arm 402 includes holonomic wheel unit 416, holonomic wheel unit 418, holonomic wheel unit 420, and holonomic wheel unit 422. These wheel units are examples of mobility components 206 in mobility system 202 shown in block form in FIG. 2.

As depicted, holonomic wheel unit 416 and holonomic wheel unit 418 are connected to housing 424. Holonomic wheel unit 420 and holonomic wheel unit 422 are connected to housing 426. These wheel units include electric motors as well as wheels. The electric motors are an example of an implementation for propulsion system 204 and mobility components 206 shown in block form in FIG. 2.

As depicted, scanner 428 is located within at least one of housing 424 or housing 426. In this illustrative example, scanner 428 takes the form of at least one of a backscatter x-ray system or a through transmission x-ray system.

In this example, controller 430 is located within housing 424 and controls the operation of scanning system 400. For example, controller 430 controls the movement of mobile scanning arm 402 and the operation of scanner 428 in performing scans.

Figure 5:
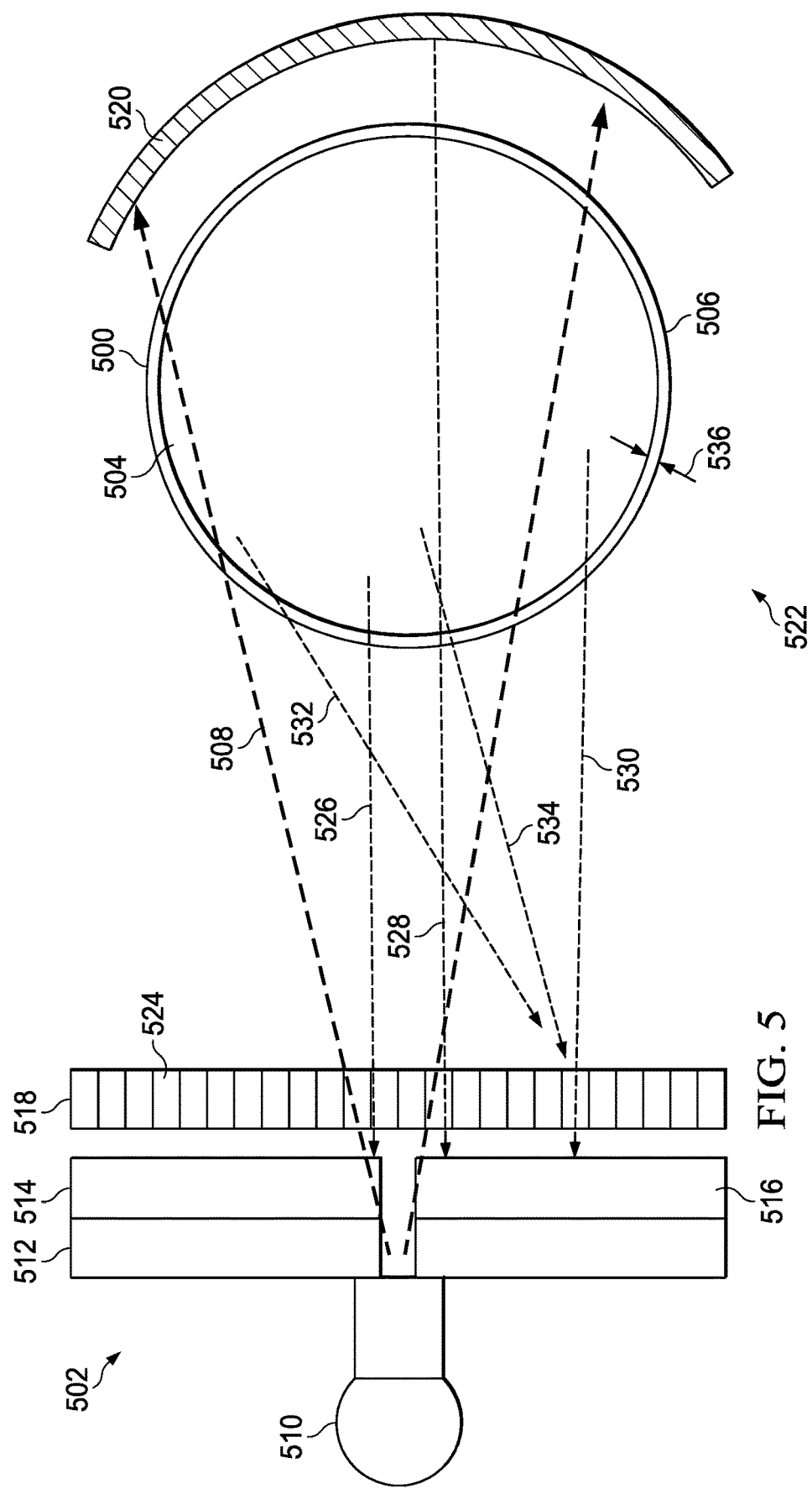
FIG. 5 is an illustration of a cross-sectional view of a scanner positioned to scan a pipe in accordance with an illustrative embodiment.

With reference to FIG. 5, an illustration of a cross-sectional view of a scanner positioned to scan a pipe is depicted in accordance with an illustrative embodiment. In this illustrative example, a cross-section of pipe 500 with scanner 502 positioned relative to pipe 500 is shown. Scanner 502 is an example of one implementation for scanner 112 shown in block form in FIG. 1.

As depicted, pipe 500 includes cavity 504 filled with oil 506. Cavity 504 is shown as being fully filled with oil 506. An inconsistency in pipe 500 can be detected by using fan beam 508 emitted from scanner 502.

In this illustrative example, scanner 502 includes a number of different components. As shown in this figure, scanner 502 includes x-ray source 510, collimator 512, detector 514, detector 516, polarization grid 518, and shield 520.

In this illustrative example, collimator 512 shapes x-ray energy to form fan beam 508 that is directed towards pipe 500. Scanning of pipe 500 with fan beam 508 results in backscatter 522. In this illustrative example, backscatter 522 is comprised of signals reflected off of items such as pipe 500 and oil 506.

As depicted, polarization grid 518 reduces the amount of backscatter 522 that reaches detector 514 and detector 516. Polarization grid 518 is configured to pass x-rays in backscatter 522 that travel in a direction that is substantially perpendicular to surface 524 of polarization grid 518. For example, signal 526, signal 528, and signal 530 in backscatter 522 pass through polarization grid 518 to reach detector 514 and detector 516. In contrast, signal 532 and signal 534 in backscatter 522 do not pass through polarization grid 518.

The use of polarization grid 518 provides an ability to pass signals in backscatter 522 that are reflected substantially directly from pipe 500 in response to fan beam 508. Rotating or moving scanner 502 can provide signals from the other portions of pipe 500.

Further, shield 520 is configured to reduce backscattering. In this example, the elongate structure, pipe 500, is located between x-ray source 510 and shield 520.

As depicted, shield 520 is comprised of a material in a structure that is positioned to absorb or reduce the backscattering of the portion of fan beam 508 that passes through pipe 500. For example, shield 520 can be comprised of a material such as lead, concrete, osmium, gold, or some other material with a suitable density or atomic weight for absorbing x-ray radiation.

Thus, backscatter 522 from other items in the environment other than pipe 500 or oil 506 is reduced. As a result, noise caused by other items may be reduced through the use of shield 520.

In one illustrative example, inconsistencies can be detected in pipe 500 by detecting wall thickness 536. For example, variations in wall thickness 536 in pipe 500 can be caused by inconsistencies, such as, at least one of a crack, corrosion, oxidization, pitting, buildups, spalling, delamination, a void, or other undesired inconsistencies in pipe 500.

In this illustrative example, the presence of fluids in the form of oil 506 can make detecting of inconsistencies in pipe 500 more difficult. By implementing scanner 502 using a controller, such as controller 114 in FIG. 1, the detection of inconsistencies in pipe 500 can be performed more easily as compared to current systems and techniques for scanning pipes or other elongate structures having a cavity in which fluids may be present.

The illustration of scanner 502 and pipe 500 in FIG. 5 is presented for purposes of illustrating one manner in which an illustrative example can be implemented. The illustration in FIG. 5 is not meant to limit the manner in which other illustrative examples can be implemented. For example, shield 520 may be considered a separate component from scanner 502 and may be omitted in other implementations. In still another illustrative example, polarization grid 518 may be omitted.

As still another example, pipe 500 may be empty or partially filled with oil 506. In yet other illustrative examples, other types of fluids may be present. These fluids may include, for example, a natural gas in a liquid form, a natural gas in a gas form, water, gasoline, or other types of liquids.

Figure 6:
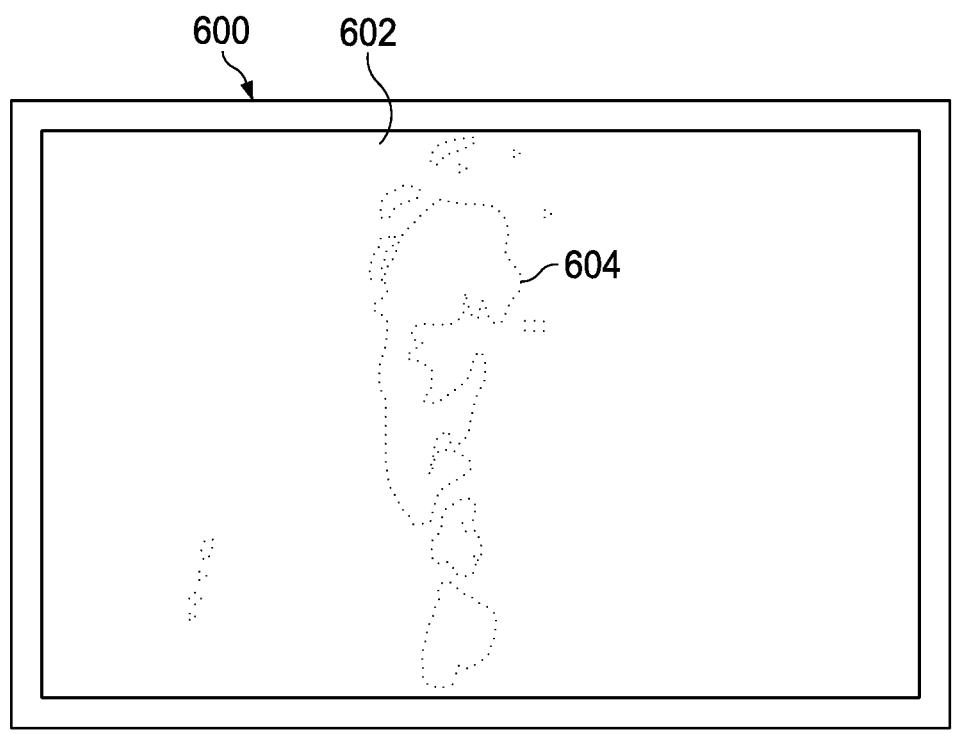
FIG. 6 is an illustration of an image generated from a scan of a pipe filled with a fluid in accordance with an illustrative embodiment.

With reference next to FIG. 6, an illustration of an image generated from a scan of a pipe filled with a fluid is depicted in accordance with an illustrative embodiment. In this illustrative example, image 600 is an example of an image that is generated using data obtained from a scan of an elongate structure, such as a pipe. The scan involves detecting backscattering of an x-ray beam directed towards the pipe. In this example, image 600 is of a pipe filled with a fluid.

As depicted, image 600 includes fluid 602 and inconsistency 604. In this example, inconsistency 604 is difficult to detect in image 600 because of the presence of fluid 602 in the pipe.

Figure 7:
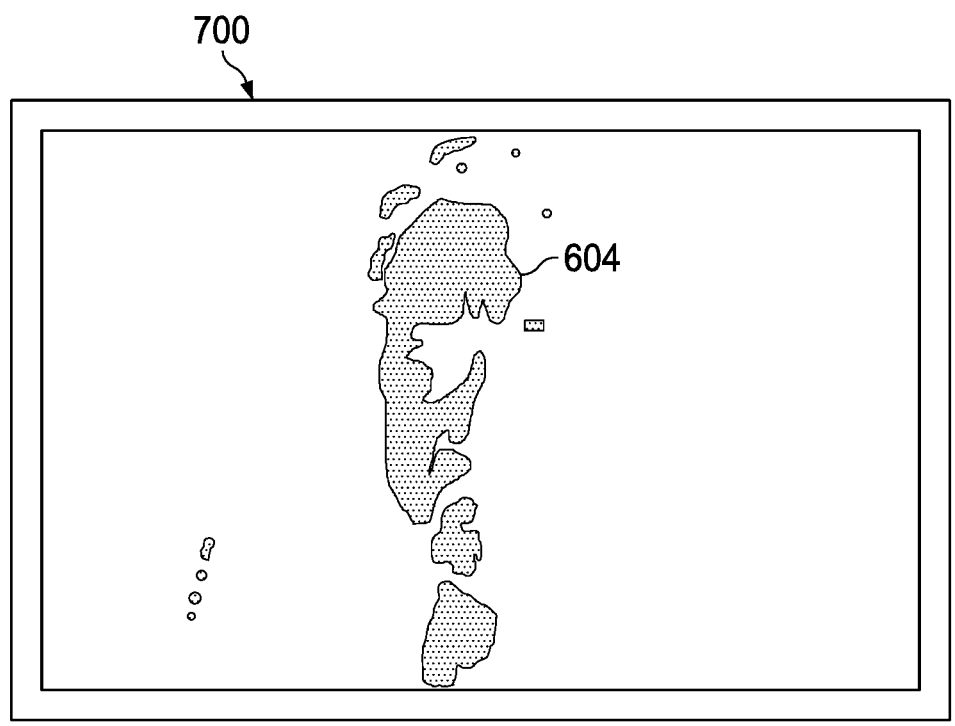
FIG. 7 is an illustration of an image generated from filtering data from a scan of a pipe in accordance with an illustrative embodiment.

With reference next to FIG. 7, an illustration of an image generated from filtering data from a scan of a pipe is depicted in accordance with an illustrative embodiment. In this illustrative example, image 700 is a result of processing data from a scan of a pipe. The processing is performed using a controller, such as controller 114 shown in block form in FIG. 1. The data from the scan is filtered to remove a portion of the data in the scan that is attributable to the fluid in the pipe. As a result, inconsistency 604 is much clearer in image 700 as compared to image 600 in FIG. 6.

Figure 8:
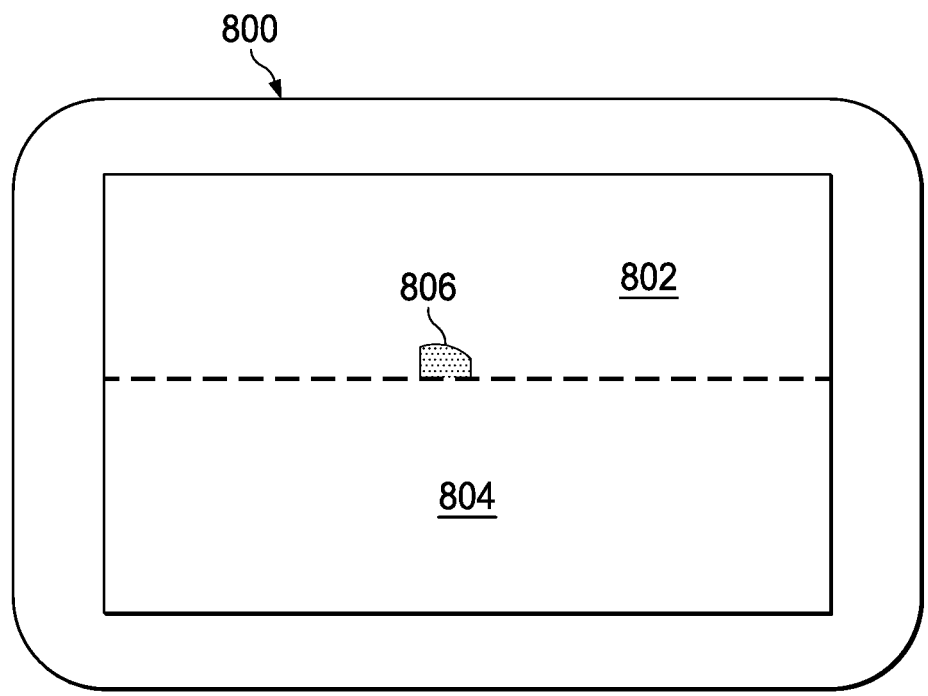
FIG. 8 is an illustration of an image generated from a scan of a pipe partially filled with a fluid in accordance with an illustrative embodiment.

With reference next to FIG. 8, an illustration of an image generated from a scan of a pipe partially filled with a fluid is depicted in accordance with an illustrative embodiment. In this example, image 800 is generated using data obtained from a scan of an elongate structure, such as a pipe, that is partially filled with a fluid. The scan involves detecting backscattering of an x-ray beam directed towards the pipe. In this illustrative example, section 802 represents the portion of the pipe that is empty while section 804 represents the portion of the pipe in which the fluid is present.

In this depicted example, a portion of inconsistency 806 can be seen in section 802 in image 800. The portion of inconsistency 806 located in section 804 of image 800 of the pipe is not readily detectable in image 800.

Figure 9:
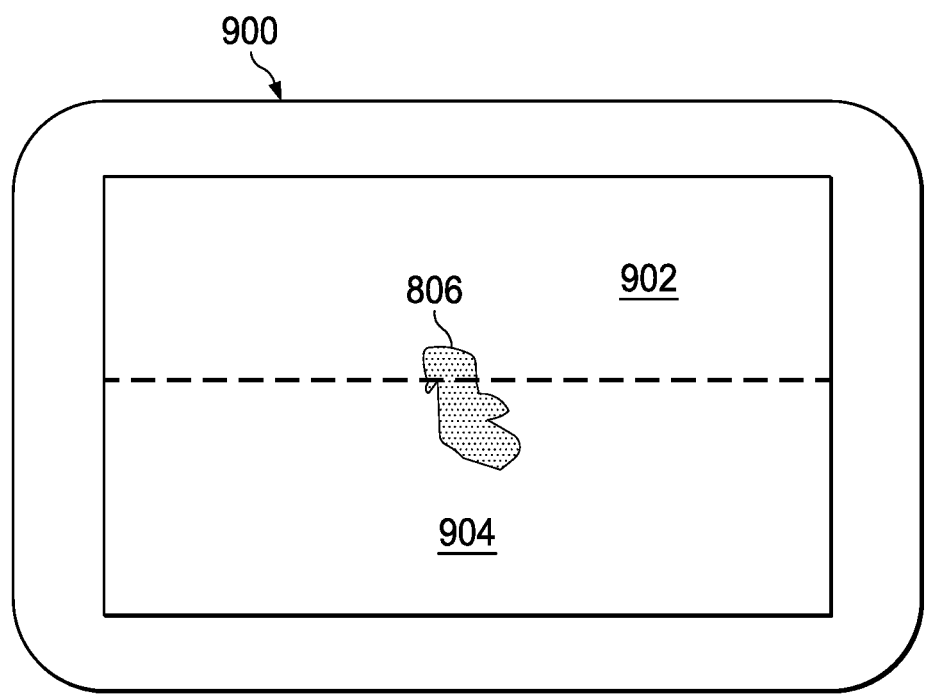
FIG. 9 is an illustration of an image generated from filtering data from a scan of a pipe in accordance with an illustrative embodiment.

With reference next to FIG. 9, an illustration of an image generated from filtering data from a scan of a pipe is depicted in accordance with an illustrative embodiment. In this illustrative example, image 900 is a result of processing data from a scan of a pipe.

Section 902 represents data from the section of the pipe in which fluid is absent. Section 904 represents the section of the pipe in which fluid is present. The data in section 904 is filtered to remove portions of the data that are attributable to the presence of the fluid in the pipe.

In this example, the filtering is performed using a high-pass filtering process to subtract the portion of signal in the backscatter detected by the detector to form the data for image 900. In this example, inconsistency 806 can now be seen more clearly in image 900 as compared to image 800 in FIG. 8.

The illustrations of images in FIGS. 6-9 are provided to depict some images that can be generated using data from a scan of a pipe. These illustrations are not meant to limit the manner in which the illustrative examples can be implemented. For example, other images may be for any elongate structure such as a fuel tank integrated in a wing of an aircraft in which the fluid is an aircraft fuel. Thus, the illustrative examples enable more accurate and complete detection of an inconsistency that may be present in elongate structures containing a fluid.

Figure 10:
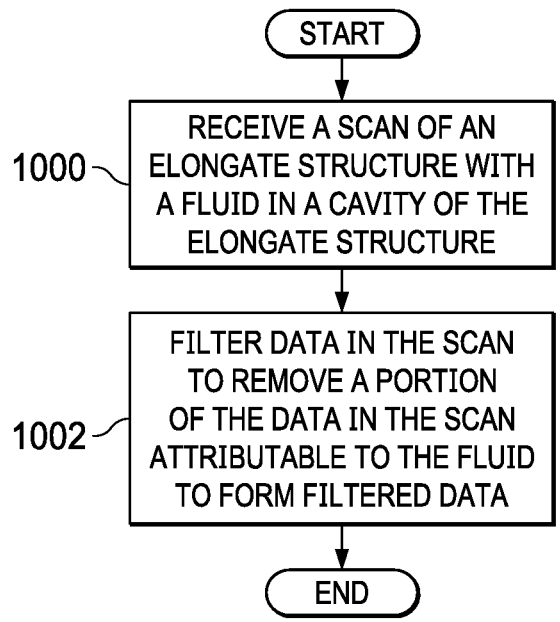
FIG. 10 is an illustration of a flowchart of a process for scanning an elongate structure in accordance with an illustrative embodiment.

Turning next to FIG. 10, an illustration of a flowchart of a process for scanning an elongate structure is depicted in accordance with an illustrative embodiment. The process illustrated in FIG. 10 can be implemented in scanning environment 100 in FIG. 1. The process can be implemented using controller 114 in scanning system 104 in FIG. 1. The different operations can be implemented in at least one of software or hardware. For example, the different operations can be implemented using software, hardware, or some combination thereof. When software is used, the different operations can be implemented in program code to cause a processor unit to perform the operations.

The process begins by receiving a scan of an elongate structure with a fluid in a cavity of the elongate structure (operation 1000). The scan in operation 1000 is generated by a scanner using an x-ray beam.

The process filters data in the scan to remove a portion of the data in the scan attributable to the fluid to form filtered data (operation 1002). The process terminates thereafter. This enables detecting an inconsistency on a wall of the elongate structure in the filtered data. This inconsistency can be on the inner or outer wall of the elongate structure. For example, this process can enables detecting an inconsistency on an interior side of a back wall of the elongate structure carrying a fluid.

With the detection of the inconsistency, an action can be performed. The action can be selected from a group comprising reworking the elongate structure, replacing a portion of the elongate structure, replacing the elongate structure, inspecting the elongates structure, performing another scan of the elongate structure, adding the location and identification of the inconsistency to a report, and other suitable actions.

Figure 11:
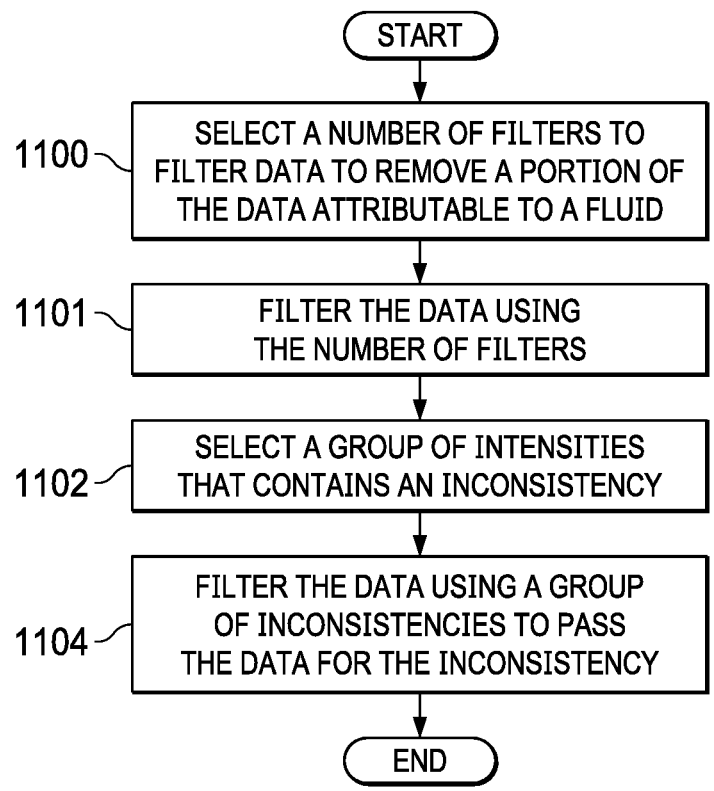
FIG. 11 is an illustration of a flowchart of a process for filtering data in a scan in accordance with an illustrative embodiment.

With reference now to FIG. 11, an illustration of a flowchart of a process for filtering data in a scan is depicted in accordance with an illustrative embodiment. The process in FIG. 11 is an example of one implementation for operation 1002 in FIG. 10.

In this illustrative example, the data in the scan comprises pixels in which the pixels indicate intensities of a backscatter of an x-ray beam detected by a scanner, wherein the intensities correspond to energy of the backscatter, and wherein the controller filters the data to remove intensities associated with the fluid. In this example, the intensity of a pixel increases as the energy of a signal in the backscatter detected at a pixel in the detector increases.

The process selects a number of filters to filter data to remove a portion of the data attributable to a fluid (operation 1100). The number of filters can be selected from at least one of a high-pass filter, a low-pass filter, a bandpass filter, or some other suitable type of filter. The type of filter or filters selected can be based on what frequencies are to be removed from the data in the image. In other words, the filters can be selected to pass data for pixels in a manner that enhances data for inconsistencies. This type of filtering can be performed in a number of different ways. For example, a Fourier transform low-pass filter or a Fourier transform high-pass filter can be used. For example, if the liquid and other background is at a higher filter than the inconsistency, a low-pass filter can be used to remove data for the liquid and other background elements. Other background elements may include, for example, intensities for backscatter detected from welding repairs, brackets in the grid, the grid structure, or other elements that can cause backscatter that can mask or act as noise, making detecting the inconsistency more difficult. The type of filter or filters can be selected to remove repeatable sections with substantially uniform intensities in the data such as those attributable to a liquid.

The process filters the data using the number of filters (operation 1101). This operation removes the portion of the data attributable to the fluid in the elongate structure. The filtering in operation 1101 can also be used to remove data attributable to other elements that form background noise.

The process selects a group of intensities that contains an inconsistency (operation 1102). The group of intensities can be selected using a standard for the inconsistency. The standard can be a material that comprises the inconsistency that is to be detected, or a material that mimics the inconsistency. The standard can be placed against the wall of the elongate structure and the elongate structure with the standard can be scanned. The wall can be an interior or exterior wall of the elongate structure without a fluid. In some illustrative examples, another elongate structure having the same specifications as the elongate structure to be inspected can be used with the standard.

The process filters the data using a group of inconsistencies to pass the data for the inconsistency (operation 1104). The process terminates thereafter.

Figure 12:
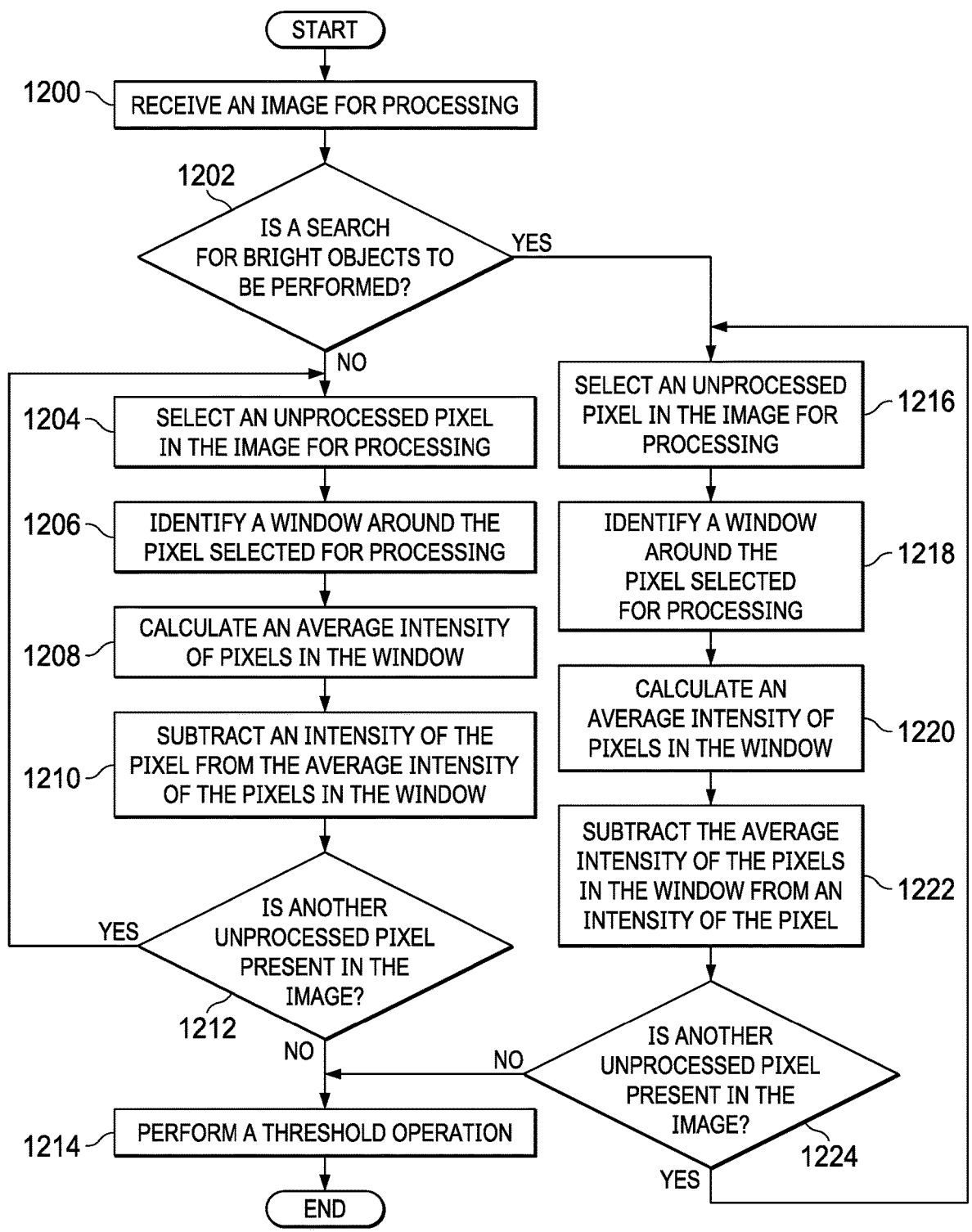
FIG. 12 is an illustration of a flowchart of process for identifying frequencies used for filtering data from a scan of an elongate structure containing a fluid in accordance with an illustrative embodiment.

With reference to FIG. 12, an illustration of a flowchart of process for identifying frequencies used for filtering data from a scan of an elongate structure containing a fluid is depicted in accordance with an illustrative embodiment. The process illustrated in FIG. 12 is an example of operations that can be used to implement operation 1000 in FIG. 10.

The process begins by receiving an image for processing (operation 1200). In operation 1200, the image is obtained from data in the scan when the sensor comprises pixels that detect backscatter.

A determination is made as to whether a search for bright objects is to be performed (operation 1202). In operation 1202, the process determines whether the inconsistency is brighter than other objects in the scan. In this example, a bright object is an object of interest, such as an inconsistency, in the data that has a higher intensity than other objects that may present. When the types of inconsistencies are known, whether those consistency show up as a bright object or not can determined for use in filtering the image.

For example, the frequencies for filtering can be determined based on identifying frequencies for the liquid in a histogram of intensities for the image and selecting filters to remove those frequencies for the liquid.

If the process is not searching for bright objects, the process selects an unprocessed pixel in the image for processing (operation 1204). The process identifies a window around the pixel selected for processing (operation 1206). The window can be square, rectangular, or any shape encompassing the pixel. The pixel is centrally located in the window in this example.

The process calculates an average intensity of pixels in the window (operation 1208). The process subtracts an intensity of the pixel from the average intensity of the pixels in the window (operation 1210).

A determination is made as to whether another unprocessed pixel is present in the image (operation 1212). If another unprocessed pixel is present in the image, the process returns to operation 1204.

Otherwise, the process performs a threshold operation (operation 1214). In operation 1214, the process selects a number of frequencies for the inconsistency for a threshold. In other words, the threshold may have more than one frequency depending on the frequency response of the inconsistency or inconsistencies for which the scan is performed. This threshold removes the data for other items other than the inconsistency.

In this illustrative example, the threshold can be based on a lookup table. The lookup table can provide one or more frequencies for the threshold value based on the characteristics of the pipe, the liquid, and the inconsistencies. This lookup table can be generated using a standard for the inconsistency with a pipe and liquid have the same characteristics as the pipe being inspected. The process terminates thereafter.

With reference again to operation 1202, if a search for bright objects is to be performed, the process selects an unprocessed pixel in the image for processing (operation 1216). The process identifies a window around the pixel selected for processing (operation 1218). The window can be square, rectangular, or any shape encompassing the pixel. The pixel is centrally located in the window in this example.

The process calculates an average intensity of pixels in the window (operation 1220). The process subtracts the average intensity of the pixels in the window from an intensity of the pixel (operation 1222).

The process determines whether another unprocessed pixel is present in the image (operation 1224). If another unprocessed pixel is present in the image, the process returns to operation 1216. Otherwise, the process proceeds to operation 1214 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special-purpose hardware systems that perform the different operations or combinations of special-purpose hardware and program code run by the special-purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
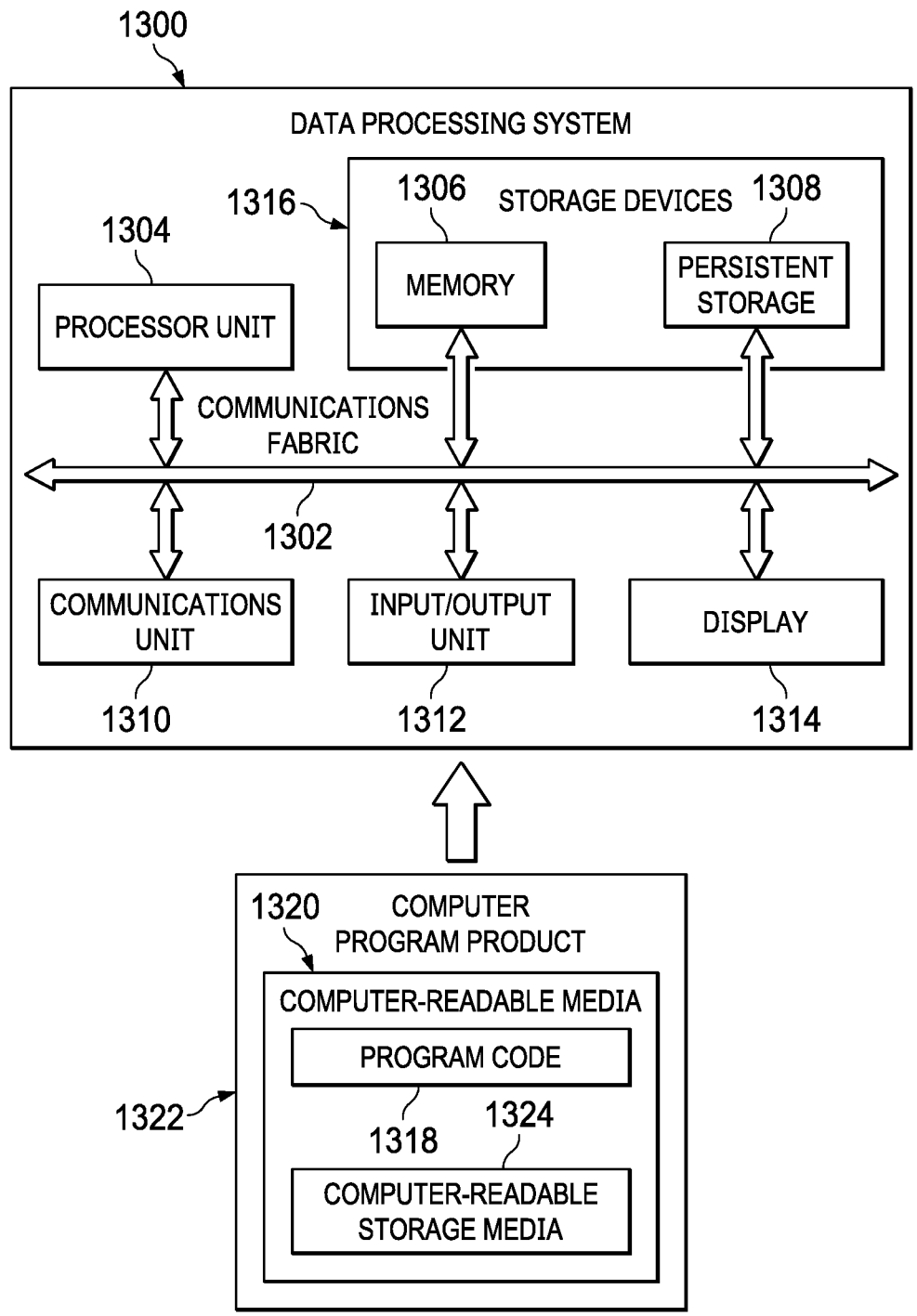
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement computer system 120 shown in block form in FIG. 1. In this illustrative example, data processing system 1300 includes communications framework 1302 (e.g. communications fabric), which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, may be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a solid-state drive (SSD), a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples.

In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 may be transferred to data processing system 1300 using a computer-readable signal media. The computer-readable signal media may be, for example, a propagated data signal containing program code 1318. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Thus, the illustrative examples provide a method, an apparatus, and a system for scanning an elongate structure. Data in a scan of the elongate structure can be filtered to remove a portion of the data in the scan attributable to the fluid, enabling detecting an inconsistency on a wall of the elongate structure using the filtered data.

As a result, one or more technical solutions may provide a technical effect of filtering data from a scan of an elongate structure, such as a pipe or fuel tank in an aircraft wing, to remove a portion of data in the scan that is attributable to the fluid. The filtering increases the ability to detect inconsistencies in elongate structures. Thus, the illustrative examples provide one or more technical solutions that enable inspecting an elongate structure for inconsistencies without having to remove the fluid from a cavity in the elongate structure. As a result, elongate structures can be more easily and quickly inspected.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A scanning system comprising:
a scanner configured to emit an x-ray beam, wherein the scanner comprises a shield configured to reduce backscatter; and
a controller in communication with the scanner, wherein:
the controller is configured to control the scanner to perform a scan;
the scan is performed on an elongate structure having a cavity with a fluid;
the scan produces data; and
the data is filtered to form filtered data, wherein:
a portion of the data attributable to the fluid is removed; and
the filtered data enables detection of an inconsistency on a wall of the elongate structure.

2. The scanning system of claim 1, wherein the scanner comprises:
an x-ray source configured to emit the x-ray beam; and
a sensor system configured to detect backscatter caused by the x-ray beam encountering the elongate structure.

3. The scanning system of claim 1, wherein the scanner further comprises:
a polarization grid that passes x-rays in backscatter that travel in a direction substantially perpendicular to the polarization grid, wherein backscattered x-rays are caused by the x-ray beam encountering the elongate structure.

4. The scanning system of claim 1, wherein the elongate structure is located between an x-ray source and the shield.

5. The scanning system of claim 1, wherein the controller filters the data to remove intensities associated with background noise.

6. The scanning system of claim 1, wherein:
the data comprises pixels that indicate intensities of a backscatter of the x-ray beam detected by the scanner;
the intensities correspond to an energy of the backscatter; and
the controller filters the data to remove the intensities associated with the fluid.

7. The scanning system of claim 6, wherein the controller selects a group of the intensities that contains the inconsistency and filters the data using the group of the intensities to pass the data for the inconsistency.

8. The scanning system of claim 7, wherein the group of the intensities is selected using a standard for the inconsistency.

9. The scanning system of claim 1, wherein the controller filters the data using at least one of a high-pass filter, a low-pass filter, or a bandpass filter.

10. The scanning system of claim 1 further comprising:
a translating structure configured to move at least one of axially or rotationally on the elongate structure, wherein the translating structure is selected from one of a motorized arm, a crawler arm, and a track-based arm.

11. The scanning system of claim 1, wherein the scanner comprises at least one of an x-ray scanning system, a backscatter x-ray system, or a through transmission x-ray system.

12. The scanning system of claim 1, wherein the elongate structure is selected from one of a pipe, an insulated pipe, an uninsulated pipe, a drum, a fuel tank, and a conduit.

13. The scanning system of claim 1, wherein the inconsistency is selected from at least one of a crack, a corrosion, an oxidization, a spalling, a delamination, or a void.

14. A pipe scanning system comprising:
a translating structure configured to move axially and rotationally on a pipe, wherein a fluid is present in the pipe;
a scanner connected to the translating structure, wherein the scanner:
is configured to scan the pipe utilizing an x-ray beam; and
comprises a shield configured to reduce backscatter;
a detector; and
a controller in communication with the translating structure and the scanner, wherein:
the controller controls the translating structure to move on the pipe while the scanner performs a scan of the pipe using the x-ray beam;
data in the scan comprises pixels that indicate intensities of a backscatter of the x-ray beam detected by the scanner;
the controller filters the data to produce filtered data;
the intensities associated with the fluid are not included in the filtered data; and
the controller determines whether an inconsistency on a back inner wall of an elongate structure is present using the filtered data.

15. The pipe scanning system of claim 14, wherein the pipe is selected from one of an insulated pipe and an uninsulated pipe.

16. A method, comprising:
receiving a scan of an elongate structure, wherein a cavity of the elongated structure has a fluid disposed therein, wherein:
the scan comprises data;
the scan is generated by a scanner using an x-ray beam; and
x-rays in backscatter travel in a direction substantially perpendicular to a polarization grid through the polarization grid; and
generating filtered data by filtering the data to remove a portion of the data attributable to the fluid, whereby detection of an inconsistency on a wall of the elongate structure in the filtered data is enabled.

17. The method of claim 16, wherein:
the data comprises pixels that indicates intensities of a backscatter of the x-ray beam detected by the scanner;
the intensities correspond to frequencies of the backscatter; and
the filtering comprises:
filtering the data to remove the intensities associated with the fluid to form the filtered data.

18. The method of claim 17, wherein the filtering further comprises:
selecting a group of the intensities that contains the inconsistency; and
filtering the data using the group of the intensities to pass the data for the inconsistency.

19. The method of claim 18, wherein the selecting comprises:
selecting the group of the intensities that contains the inconsistency using a standard for the inconsistency.

20. The method of claim 16, wherein the filtering comprises:
filtering the data to remove a portion of the data attributable to the fluid to form the filtered data using at least one of a high-pass filter, a low-pass filter, or a bandpass filter, whereby detection of the inconsistency on the wall of the elongate structure is enabled.

21. The method of claim 16, wherein backscattered x-rays are caused by the x-ray beam encountering the elongate structure.

22. The method of claim 16, wherein the elongate structure is selected from one of a pipe, an insulated pipe, an uninsulated pipe, a drum, and a conduit.

23. The method of claim 16, wherein the inconsistency is selected from at least one of a crack, a corrosion, an oxidization, a spalling, a delamination, or a void.

* * * * *